United States Patent Office 2,738,550
Patented Mar. 20, 1956

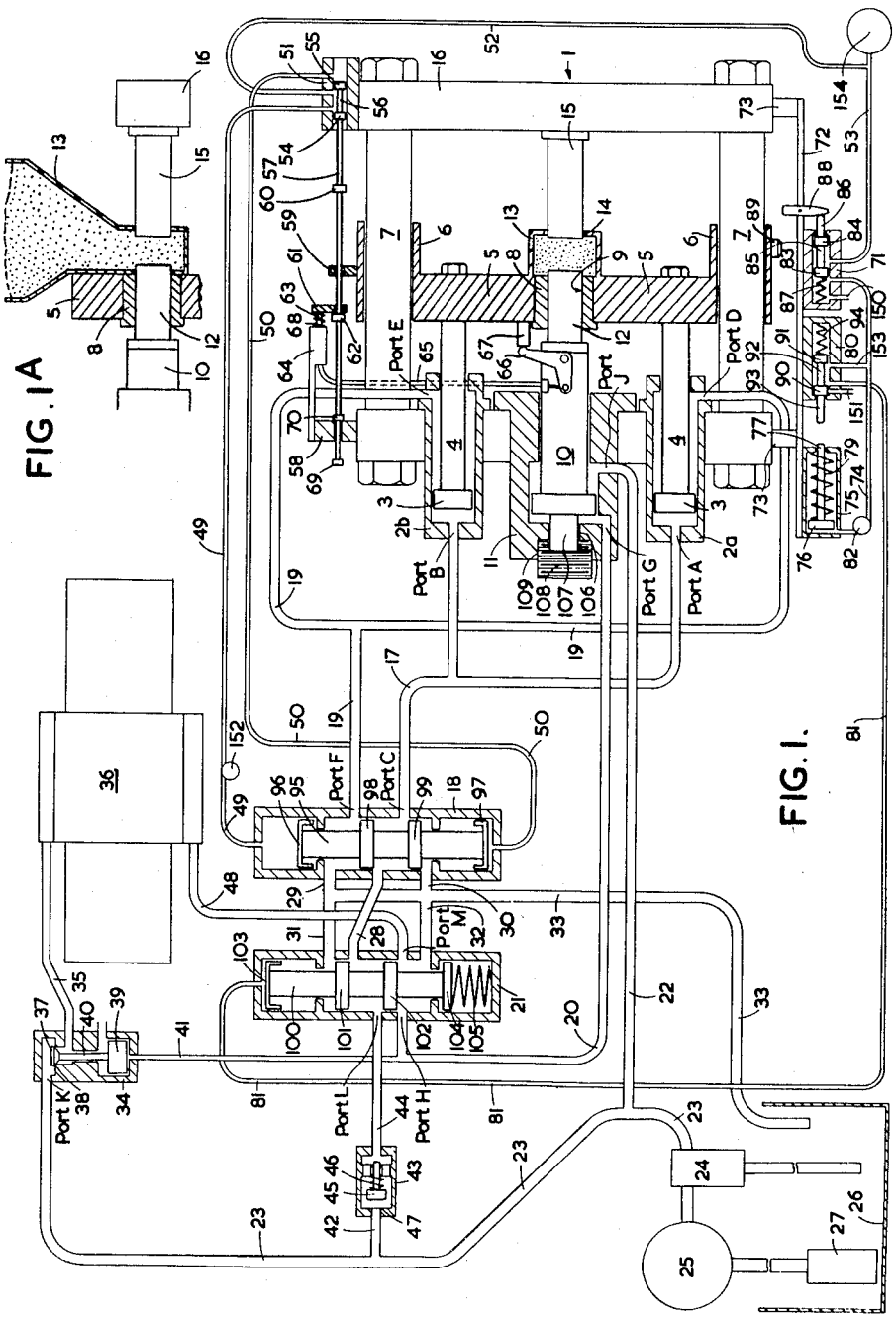

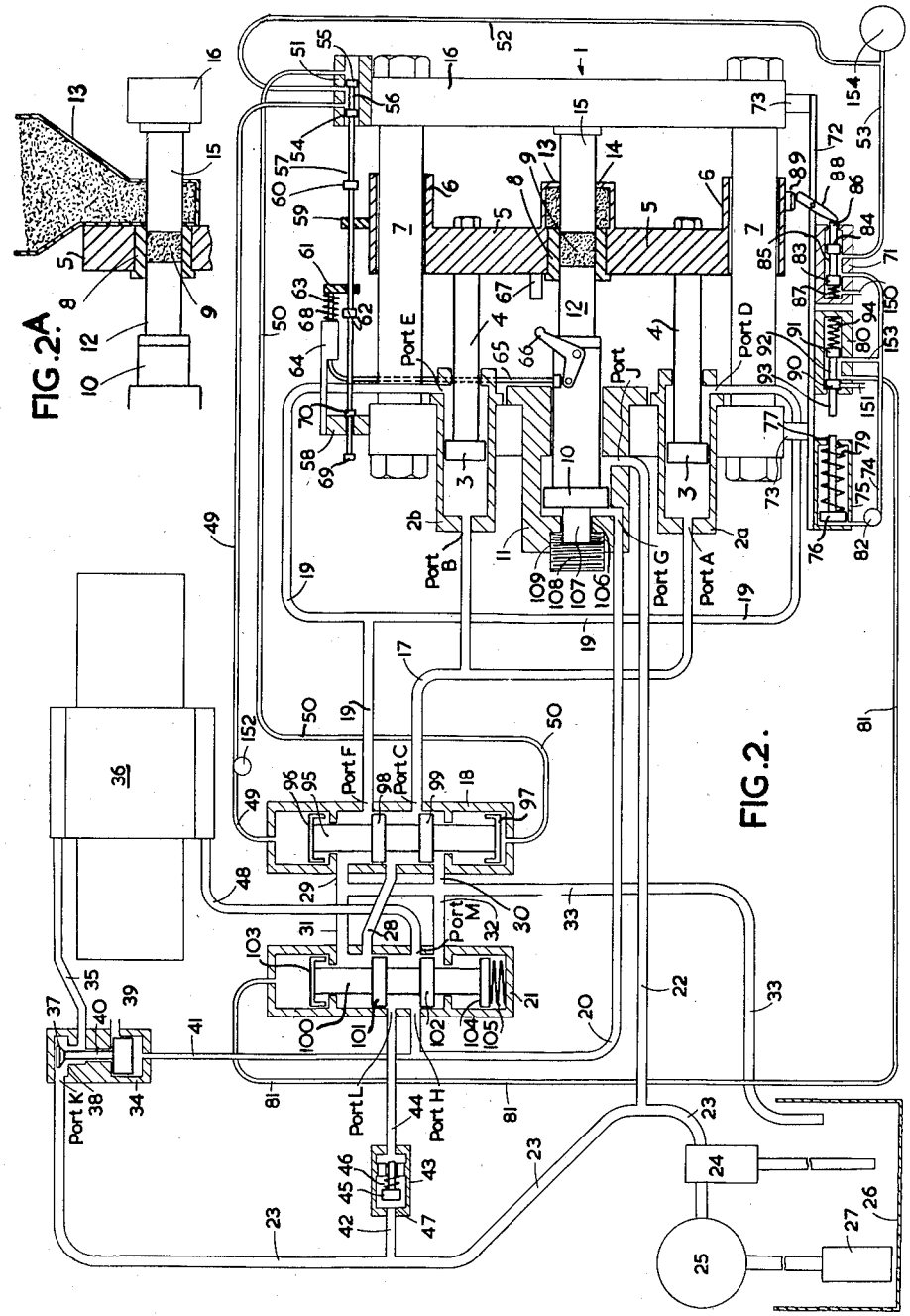

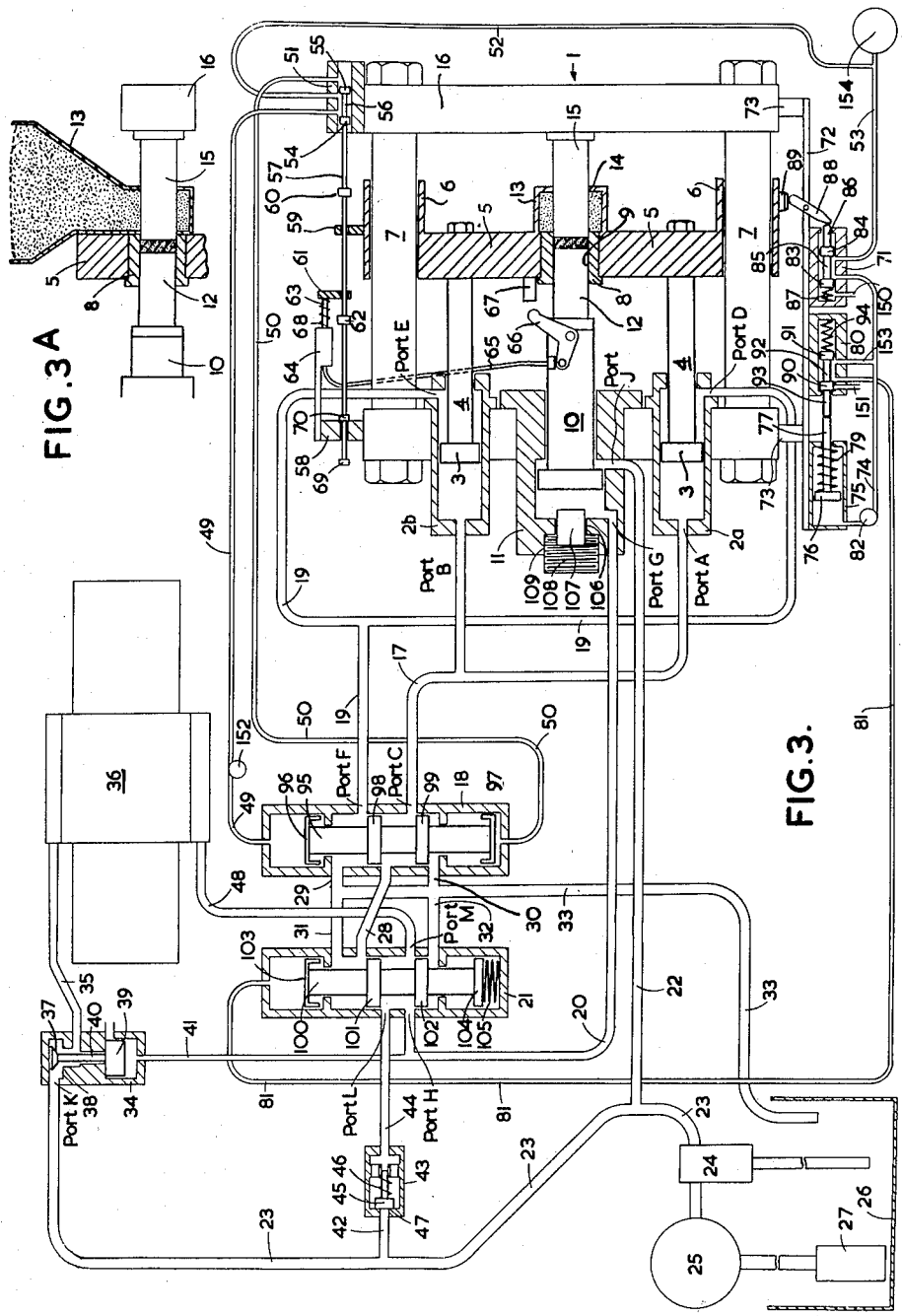

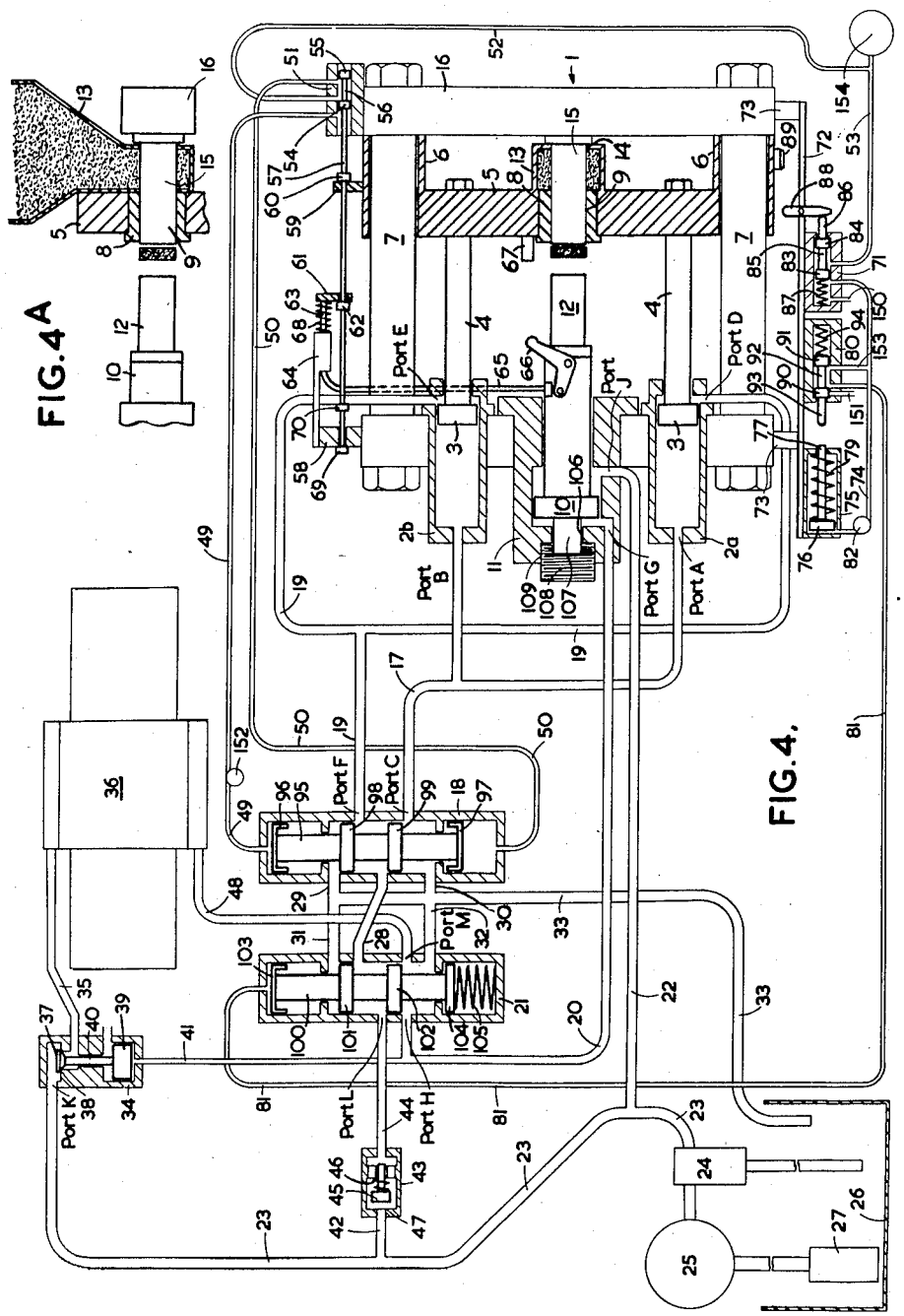

2,738,550

MACHINE FOR DISPENSING PREDETERMINED QUANTITIES OF MATERIAL IN LOOSE OR COMPRESSED FORM

Walter Robert Groves, London, England, assignor to British Industrial Plastics Limited, London, England, a company of Great Britain Application November 25, 1952, Serial No. 322,533

Claims priority, application Great Britain November 30, 1951

9 Claims. (Cl. 18—16.5)

This invention relates to a machine for dispensing predetermined quantities of powder or granular material, and has for one of its objects the provision of such a machine which is compact in assembly, simple in operation, has a minimum number of moving parts, and is particularly suitable for operating by hydraulic power. Another object of the invention is the provision of such a machine which will, when desired, dispense the predetermined quantities of powder or granular material in a compressed form, such as a pellet or tablet, instead of in its loose form.

According to the present invention a machine for dispensing predetermined quantities of powder or granular material comprises a first longitudinal member and a second longitudinal member, the two members being aligned and spaced apart to leave a gap of predetermined length, a sleeve and a supply container slidable along said members from a first position where the sleeve lies on the first member only and where the supply container surrounds the gap so as to fill the gap with material, to a second position where the sleeve surrounds the gap so that the material in the gap is completely enclosed and the supply container lies on the second member only, and thence to a third position where the sleeve and the supply container lie on the second member only and the gap is exposed for the discharge of the material therefrom.

Means are preferably provided for adjusting the length of the gap prior to operation of the machine in order to vary the quantity of material that is dispensed therefrom at any one operation.

In order that the machine may be used for dispensing each predetermined quantity of powder or granular material in a compressed form, according to a further feature of the present invention, means are provided for bringing the two longitudinal members towards each other in the said second position for the purpose of compressing the material therebetween, the said longitudinal members thus constituting punches and the said sleeve thus constituting a die.

Preferably the die is carried by a horizontal reciprocatory die holder which also carries the supply container, one of the punches is fixed, and the other punch is horizontally reciprocatory so as to move towards and away from the fixed punch.

The reciprocations of the die holder and the punch are preferably effected automatically by hydraulic means the operation of which is controlled by movement of the die holder through a pneumatic system comprising valve means operated in a predetermined sequence by the die holder.

The die holder and the reciprocatory punch are preferably coupled respectively to hydraulic rams which are actuated in accordance with the position of the die holder.

The heads of the respective punches may be profiled to any desired form.

The invention is illustrated diagrammatically by way of example in the accompanying drawings in which a horizontal hydraulically operated machine is shown.

In these drawings:

Figure 1 is a sectional plan of the machine and its pneumatically operated hydraulic control mechanism and Figure 1a is a sectional elevation of a detail of Figure 1.

Figures 2–4 and Figures 2a, 3a, and 4a are similar views to Figures 1 and 1a respectively showing different stages in one operating cycle of the machine.

Referring to Figures 1 and 1a of the drawings a horizontal framework generally indicated at 1 carries at one end (the left hand end in the drawings) a pair of cylinders 2a and 2b in each of which a piston 3 is movable by hydraulic power. The piston rods 4 of pistons 3 are secured at their outer ends to a die holder 5 slidably mounted by sleeves 6 on tie rods 7 forming part of the framework 1. The die holder carries a die 8 containing a die cavity 9. A hydraulically operated ram 10 is movable in a cylinder 11 situated within and at one end of the framework 1, the ram carrying a punch 12 in axial alignment with the die cavity 9 so that on relative movement of the die holder and punch 12 towards each other the punch will enter the die cavity.

The die holder 5 carries an open topped hopper 13 which is apertured at 14 as shown, in axial alignment with the die cavity 9 so as to permit the passage therethrough of a stationary punch 15 on movement of the die holder to the right in the drawings. The punch 15 is secured to an end plate 16 of the framework in axial alignment with the punch 12 and, therefore, also in axial alignment with the aperture 14 and die cavity 9.

The hydraulic operating circuit of the machine will now be described.

The left hand ends of the pair of cylinders 2a and 2b are connected at ports A and B respectively by a fluid conduit system 17 to port C of an air-operated hydraulic valve 18, and the other ends of the cylinders 2a and 2b are connected at ports D and E respectively by a conduit system 19 to port F of the valve 18. The left hand end of cylinder 11 is connected at port G by a conduit 20 to port H of a second air-operated hydraulic valve 21, and the other end of cylinder 11 is connected at port J by a conduit 22 to a conduit 23 one end of which is in turn connected, through a pressure relief valve 24 to the delivery side of a pressure pump 25 supplying the hydraulic circuit of the machine with pressure fluid having a pressure of approximately 1000 lbs. p. s. i. The pump draws fluid from a supply tank 26 through a filter 27. A short conduit 28 connects the two valves 18 and 21 together, and conduits 29, 30, 31 and 32 connect respectively the valves 18 and 21 to a common exhaust conduit 33 leading to the supply tank 26.

The other end of conduit 23 is connected at port K to a hydraulically operated control valve 34 which is connected by a conduit 35 to the low pressure inlet side of a pressure intensifier generally indicated at 36 whose operation is controlled by the valve 34 as will be hereinafter described.

Control valve 34 comprises a mushroom headed valve element 37 which is held onto its seat 38 by fluid pressure in conduit 23 and is adapted to be moved off its seat, to allow the fluid pressure in conduit 23 to pass to conduit 35, by fluid pressure acting on one side of a hydraulic piston 39 connected to a valve stem 40 of the valve element 37. The other side of piston 39 is open to atmosphere. A conduit 41 connects valve 34 to conduit 20 adjacent to port H of the hydraulic valve 21.

A short conduit 42 connects conduit 23 to one side of a non-return valve 43 the other side of which is connected by a conduit 44 to port L of the valve 21. The non-return valve is of normal type comprising a valve element 45 biased by a spring 46 onto a seat 47 and normally held off its seat by fluid pressure in conduit 42. The valve 21 is connected at port M by a conduit 48 to the high pressure delivery side of the pressure intensifier 36.

The pneumatic controlling circuit of the machine will now be described.

Both ends of the air-operated valve 18 are connected respectively by conduits 49 and 50 to a pneumatic piston valve 51 secured to the end plate 16 of the framework 1. An adjustable needle valve 152 is provided in conduit 49. A conduit 52 connects the said piston valve to conduit 53 which is in turn constantly connected to the delivery side of a pump 154 supplying air under pressure.

Piston valve 51 comprises two pistons 54 and 55 mounted on a common piston rod 56 formed by one end of an operating rod 57 situated parallel to the tie rod 7 and having its other end slidably mounted in a guide 58. The pistons 54 and 55 are moved to the right (in Figure 1) in the valve 51 by an abutment 59 carried by the sleeve 6 of the die holder 5 which acts on and moves a stop 60 carried by the operating rod 57 when the said die holder moves to the right.

The said valve pistons are returned to the position shown in Figure 1, i. e. moved to the left, by an abutment 61 acting on a stop 62 carried by the operating rod 57. The abutment 61 is slidably mounted by a guide rod 63 in a guide 64 and is connected by a Bowden cable 65 to one end of a bell-crank lever 66 pivotally mounted on the ram 10 and adapted to be moved by an abutment 67 carried by the die holder 5.

The bell-crank lever is returned to its initial position when the die holder is moved away, by a spring 68 mounted on the guide rod 63 and interposed between the guide 64 and abutment 61. The amount of movement of the operating rod 57 is limited by two stops 69 and 70 positioned on the end of the said rod, one either side of the guide 58.

Conduit 53 is connected to a pneumatic piston valve 71 mounted on a plate 72 secured by brackets 73 to the framework 1. A further conduit 74 connects the piston valve 71, through an adjustable needle valve 82, to a cylinder 75 which is secured to the plate 72 and in which is mounted a piston 76 having a piston rod 77 projecting through the end wall of the cylinder, the piston being biased to the left in the drawing by a spring 79. A conduit 150 connects valve 71 to atmosphere. A branch conduit 153 connects conduit 74 to a second pneumatic piston valve 80 secured on the plate 72 adjacent to the piston valve 71, and a conduit 151 connects the valve 80 to atmosphere. A conduit 81 connects the valve 80 to one end of the hydraulic valve 21.

Piston valve 71 comprises two pistons 83 and 84 mounted on a common piston rod 85 having an extension 86 projecting through the end wall of the valve. The pistons are biased continuously to the right in the drawing by a spring 87 so that the extension 86 is held in contact with one end of a lever 88 pivotally mounted on the plate 72. The other end of lever 88 is situated in the path of travel of a cam 89 carried by the sleeve 6 sliding on the tie rod 7, the lever being tilted by the cam on movement of the die holder to the right in the drawing so as to cause operation of the valve.

Piston valve 80 is similar to valve 71 in that it has two pistons 90 and 91 mounted on a common piston rod 92 which is provided with an extension 93 projecting through an end wall of the valve, but in this case the pistons are biased continuously to the left in the drawing by a spring 94. The extension 93 projects in alignment with piston rod 77 of piston 76 so that it may be struck and moved by the said piston rod when piston 76 is moved to the right.

The hydraulic valve 18 comprises a valve piston 95 formed at either end with piston heads 96 and 97 respectively and carrying two partition flanges 98 and 99. The air-operated valve 21 is similar to valve 18 in that it comprises a piston 100 carrying two partition flanges 101 and 102, but it is formed with only one piston head 103 at one end, the other end being formed with a plate 104 against which a spring 105 acts to bias the piston continuously in an upward direction in the drawing.

The operation and control of the machine by the hydraulic and pneumatic circuits and devices described when used for dispensing each predetermined quantity of powder or granular material (hereinafter referred to as "powder") in a compressed tablet or pellet form is as follows:

One complete cycle of operation of the machine is effected in four stages which are respectively, (1) the die holder 5 is moved so that the space between the punches 12 and 15 is within the hopper 13 and the space is filled with powder, (2) the die holder is moved to a position where the charge of powder between the punches is enclosed within the die cavity 9, (3) pressure is applied by the movable punch 12 on the charge of powder within the die cavity thus compressing it and making the tablet or pellet (hereinafter referred to as "pellet"), and (4) the movable punch 12 is retracted and the die holder is moved over the stationary punch 15 so that the pellet is ejected and falls away by gravity.

In Figures 1 and 1a of the drawings the machine is shown at the end of the first of these stages. The pistons 3 have been moved to the extreme left hand of their travel in the cylinders 2a and 2b and the die holder 5 and its hopper 13 are in the position where the space between the two punches 12 and 15 is within the hopper 13 and is filled with a charge of powder. The die holder 5 has reached the end of its movement to the left and abutment 67 carried by the die holder has moved the bell-crank lever 66 which in turn has operated the Bowden cable 65 to cause abutment 61 to act on the stop 62 on the operating rod 67 and thus move the pistons of piston valve 51 to the left in the drawing to the position shown. This movement of piston valve 51 has caused air under pressure from conduit 52 to flow between pistons 54 and 55 of valve 51, conduit 49 and needle valve 152 and act on piston head 95 of the hydraulic valve 18, causing piston 95 to move downwards to the position shown in Figure 1. Conduit 50 is connected to atmosphere.

Needle valve 152 can be adjusted to vary the rate of flow of air under pressure therethrough to valve 18 so as to control the length of time that the die holder is in the position shown in Figures 1 and 1a. This has been found necessary to make allowances for the poor quality of some powders which may be used in the machine, which powders are of a fine nature and require longer time to fill the space between the two opposing punches than better quality powders of large and more constant particle size.

Movement of valve piston 95 causes ports A and B of cylinders 2a and 2b respectively to be connected to the pressure fluid in conduit 23 by way of the conduit system 17, port C of valve 18, through valve 18 between the flanges 98 and 99, conduit 28, through valve 21 between the flanges 101 and 102, port L of valve 21, conduit 44, non-return valve 43 and conduit 42.

Ports D and E of cylinders 2a and 2b respectively are connected to the exhaust conduit 33 by way of the conduit system 19, port F of valve 18, through valve 18 on the upper side of flange 98 and conduit 29.

Port J of cylinder 11 is at all times in constant connection with the pressure fluid in conduit 23 by way of conduit 22. Port G of cylinder 11 is connected to exhaust conduit 33 by way of conduit 20, port H of valve 21, through valve 21 on the lower side of flange 102 and conduit 32. Conduit 48 leading from the delivery side of the intensifier 36 is also connected to exhaust conduit 33 by way of port M of valve 21, through valve 21 on the lower side of the flange 102 and conduit 32.

Port K of the control valve 34 is at all times in constant connection with the pressure fluid in conduit 23.

With the hydraulic and pneumatic circuits of the machine in the condition just described the pistons 3 of cylinders 2a and 2b are moved to the right in the drawings thus also moving the die holder 5 to the right.

*Stage 2.—Figures 2 and 2a*

When the die holder 5 reaches a predetermined position in its movement to the right, just prior to that position shown in Figures 2 and 2a, the cam 89 on the sleeve 6 strikes and rocks the lever 88 causing its lower end to move to the left and strike the extension 86 on the piston rod of piston valve 71 and move the pistons 83 and 84 to the left against the action of spring 87 to the position shown. This movement of valve 71 causes air under pressure from conduit 53 to flow through valve 71 between pistons 83 and 84, through conduit 74 and needle valve 82, and act on piston 76 in cylinder 75 moving it slowly to the right against the action of spring 79 at a speed dependent on the rate of flow of air through the needle valve 82. By adjusting this valve, the rate of flow of air therethrough can be varied so as to vary the speed of movement of piston 76 for the purpose hereinafter described.

At the same time air under pressure from conduit 74 flows through conduit 153, through valve 80 between pistons 90 and 91 and conduit 81, and acts on piston head 103 of piston 100 of valve 21 causing the piston to move downwards in the drawing against the action of spring 105 to the position shown in Figure 2. This operation of valve 21 causes the pressure fluid acting on pistons 3 in cylinders 2a and 2b to be cut off by the flange 101 of piston 100 of valve 21, and ports A and B of cylinders 2a and 2b respectively are connected to exhaust conduit 33 by way of conduit system 17, through valve 18 between flanges 98 and 99, conduit 28, through valve 21 on the upper side of flange 101 and conduit 31. The die holder is, therefore, stopped in its rightward travel in the position shown in Figure 2 with the charge of powder completely enclosed within the die cavity.

*Stage 3.—Figures 2, 2a, 3 and 3a*

Simultaneously the operation of valve 21 causes pressure fluid to pass from conduit 23 by way of conduit 42, non-return valve 43, conduit 44 port L of valve 21, between flanges 101 and 102 of valve 21, port H and conduit 20 to port G of cylinder 11, and moves ram 10 and the punch 12 carried thereby to the right against the constant fluid pressure exerted on the annulus return portion of ram 10, so that the charge of powder within the die cavity 9 is compressed between the stationary punch 15 and the punch 12.

As the ports A and B, and D and E are all connected to exhaust conduit 33 as described, the pressure in the cylinder spaces on both sides of each piston 3 is equal, and, therefore the die holder 5, although stationary as regards any pressure fluid movement on the pistons 3, is free to move, i. e., at this point, during compression of the powder, the die holder is more or less floating, and this ensures that a more even pressure is applied over the length of the powder being compressed resulting in a finished pellet having a substantially constant density throughout its thickness.

Conduit 41 leading to control valve 34 is also connected to the pressure fluid in conduit 20 but as the pressure of this fluid is the same as the pressure of the fluid constantly connected to port K of control valve 34 i. e. pump pressure of approximately 1000 lbs. p. s. i., no immediate movement of the control valve takes place. However, as the density of the charge of powder within the die cavity becomes greater as compression continues, fluid pressure builds up in the conduits in direct connection with the pump 25, i. e. conduits 20, 22, 23, 41 etc., until this pressure is sufficient to cause opening of the relief valve 24. The pressure thus built up in these conduits is applied to the piston 39 of control valve 34 by way of conduit 41. As the operative surface area of piston 39 on which the pressure fluid acts is larger than the surface area of valve element 37, the said valve element is caused to lift off its seat when the pressure fluid reaches, for example, a pressure of 80% of the pump pressure, thus permitting pressure fluid in conduit 23 to pass by way of port K and conduit 35 to the pressure input side of the intensifier 36.

As has been previously mentioned, the normal circuit operating pressure of the machine being described is of the order of 1000 lbs. p. s. i. and the intensifier 36 is intended to increase this pressure by a 3:1 ratio to approximately 3,000 lbs. p. s. i. Thus the pressure fluid supplied to the input side of the intensifier by conduit 35, as just described, has a pressure of 1,000 lbs. p. s. i., and the pressure fluid delivered by the intensifier from the output side by way of conduit 48 has a pressure of the order of 3,000 lbs. of p. s. i. This high pressure fluid in conduit 48 passes by way of valve 21 between the flanges 101 and 102 of piston 100, conduit 20 and port G of cylinder 11, and acts on ram 10 to cause the punch 12 to compress the powder within the die cavity by a pressure of approximately 35 tons instead of the normal compression pressure without intensification, of 10 tons.

High pressure fluid from the intensifier also passes by way of valve 21 between the flanges 101 and 102, port L and conduit 44 to non-return valve 43, the piston 45 of which is instantly moved on to its seat 47 and closes the valve against the pressure fluid at circuit pressure in conduit 42. High pressure fluid also passes from conduit 20 to the piston 39 of control valve 34 by way of conduit 41 and maintains this valve positively open.

*Stage 4.—Figures 3, 3a, 4 and 4a*

Air under pressure in conduit 74 is causing piston 76 to move to the right in cylinder 75 against the action of spring 79 at a slow speed dependent on the setting of needle valve 82, as has been described in stage 2. The setting of this needle valve determines the length of dwell of the die holder in the position shown in Figures 2, 2a, 3 and 3a can be regulated to control the duration of compression of the charge of powder and thus obtain any desired density.

When the powder has been under compression for the selected period of time, piston 76 will have moved far enough to the right in cylinder 75 for its piston rod 77 to contact extension 93 on the piston rod 92 of piston valve 80 and move pistons 90 and 91 to the right to the position shown in Figure 3. This action causes the air under pressure in conduit 81 acting on piston 103 of valve 21 to be cut off by piston 90 of valve 80, and conduit 81 is connected to exhaust conduit 151 by way of the left hand side of piston 90. Piston 100 of valve 21 is moved upwards by its spring 105 and is reset into its initial position shown in Figure 3.

Resetting of valve 21 causes the high pressure fluid in conduit 20 connected to port G of cylinder 11 and acting on ram 10 to be cut off, and conduit 20 is connected to exhaust conduit 33 by way of port H of valve 21, the underside of flange 102 and conduit 32. Ram 10, therefore, is moved to the left under the constant pressure of fluid in conduit 22 acting on the annulus return portion of ram 10 by way of port J, and punch 12 carried by the ram is retracted from the die cavity 9 as shown in Figure 4. The ram is moved to the extreme left hand end of cylinder 11 and the punch 12 is moved away from the punch 15 to its furthest extent.

As conduit 20 is connected to exhaust, conduit 41 connecting control valve 34 to conduit 20 is also exhausted and valve element 37 is reseated to close valve 34 by pressure fluid from conduit 23 which, as already described, is in constant connection with port K of this valve. Conduit 48 connecting the high pressure output side of the intensifier to port M of valve 21 is also connected to exhaust conduit 33 by way of the underside of flange 102 and conduit 32.

At the same time, and also by reason of the operation of valve 21, conduit 44 connecting the non-return valve 43 to port L of valve 21 is connected to ports A and B of cylinders 2a and 2b respectively by way of valve 21 between flanges 101 and 102 of piston 100, conduit 28 connecting valve 21 to valve 18, between flanges 98 and 99 of piston 95, port C and the conduit system 17. Conduit 44 is, therefore, exhausted of high pressure fluid and piston 45 of the non-return valve is forced off its seat against the action of spring 46 by pressure fluid in conduit 42.

With non-return valve 43 again open pressure fluid from conduit 23 passes to ports A and B of cylinders 2a and 2b respectively by way of the route just described, and movement of pistons 3 in cylinders 2a and 2b is restarted to the right thus moving the die holder and hopper 13 to the extreme right hand position as shown in Figure 4. During this rightward movement the die holder passes over the stationary punch 15 which passes through the die cavity 9 and ejects the compressed charge of powder therefrom. The powder now in pellet form falls away from the machine by gravity and is collected.

As the die holder moves to the right as described in the preceding paragraph, cam 89 on the sleeve 6 releases lever 88, and pistons 83 and 84 of valve 71 are moved to the right by spring 87, extension 86 restoring lever 88 to its initial position as shown in Figure 4. This movement of the pistons of valve 71 causes air under pressure in conduit 53 to be cut off from conduit 74 and piston 76 is returned by spring 79 to its initial position at the extreme left hand end of cylinder 75.

At the same time movement of the die holder to the right causes abutment 59 carried by the other sleeve 6 of the die holder to strike and move the stop 60 on the operating rod 57 to the right, whereby the rod itself and pistons 54 and 55 formed thereon are also moved to the right in valve 51. This causes air under pressure from conduit 52 to pass by way of valve 51 between pistons 54 and 55, and conduit 50 and act on piston head 97 of piston 95 of valve 18, to move this piston upwards in the drawing to the position shown in Figure 4.

Through operation of valve 18 pressure fluid passing to ports A and B of cylinders 2a and 2b respectively from conduit 23 by way of valves 21 and 18 and conduit system 17 as described is cut off by partition flange 99 of piston 95 of valve 18, and pressure fluid from conduit 23 now passes to ports D and E of cylinder 2a and 2b respectively by way of non-return valve 43, port L of valve 21, between flanges 101 and 102 of valve 21, conduit 28, between flanges 98 and 99 of valve 18, port F and conduit system 19, and pistons 3 are moved to the extreme left in cylinders 2a and 2b returning the die holder and punch 12 to the initial position shown in Figure 1 with the space between the punches 12 and 15 once again within the hopper 13 to receive another charge of powder. The cycle of operation is now complete. As the die holder reaches the left hand end of its travel the abutment 67 carried thereby strikes and moves the bell-crank lever 66, as previously described in stage 1, whereby the machine recommences another cycle.

On the leftward movement of the die holder, the lever 88 is struck by cam 89 on sleeve 6 and rocks it about its pivot in an idle movement in the opposite direction to that previously described.

In order to adjust, at will, the gap between the punches when the die holder is in the initial position shown in Figure 1, so as to vary the amount of the charge of powder which fills the space between the two punches at the commencement of each cycle, the left end of cylinder 11 is extended and is provided with a bore 106 therethrough for receiving a rod 107 which is attached to a screw threaded plug 108 engaging with a screw thread formed on the wall of a larger bore 109. By adjusting the plug in the bore 109 the rod 107 is caused to project to any desired amount into cylinder 11 and this enables the leftward movement of the ram 10 to be stopped by the rod 107 at a desired point in its travel. By this means the weight and thickness of the compressed pellet may be varied to suit requirements.

It will be appreciated that no undue strain is placed on the screwed plug 108 by the ram 10 because of the fact that the plug only has the pressure exerted against it by the ram through the rod 107 of the pressure fluid acting on the annulus return portion of the ram. Also, as port J of cylinder 11 is in direct and constant connection with the pump delivery side by way of conduit 23, it is impossible for intensified pressure fluid to act on the annulus return portion of ram 10 to force the screwed plug 108 out of adjustment in bore 109. When the gap between the punches has been regulated by the screwed plug 108 to cause the ram to stop short in its leftward movement in order to lessen the amount of powder filling the gap between the punches, it is clearly undesirable and unnecessary for the die holder 5 to move as far to the left as it would for a larger charge of powder, and it is necessary, therefore, to automatically stop the leftward movement of the die holder in accordance with the position of the ram 10. This is achieved by the use of the Bowden cable 65 and bell-crank lever 66 operated by the abutment 67 carried by the die holder 5, the operation of which mechanism has already been described in detail.

It will be appreciated that when it is desired to dispense the charges of powder in loose form, stage 3 of the operating cycle described above, wherein punch 12 is moved into the die cavity to compress the charge, is omitted and the punch 12 is maintained in a fixed position during the operating cycle so that, as the stationary punch 15 passes through the die cavity on movement of the die holder to the right, the charge of powder is discharged therefrom without any change in its original form. Thus to use the machine which has been described with reference to the drawings to dispense the charge of powder in loose form, operation of the lever 88 by cam 89 on sleeve 6 is prevented by removing the said lever from out of the path of the cam. By this action the valves controlling the operation of the punch 12 and the intensifier 36, i. e. the pneumatic piston valves 71 and 80, hydraulic valve 21 and controlling valve 34 are rendered inoperative and the machine is controlled and operated only by pneumatic valve 51 and the hydraulic valve 18, the die holder moving with a straight forward continuous reciprocatory movement.

The machine described above in accordance with the invention has many advantages over known types of machines for compressing powder into pellet form. Thus there are no mechanical devices passing in and out of the space between the punches. There is a minimum length of power strokes to accomplish the compressing of the powder, and the machine is simple in operation due to the small number of moving parts. As the edge of the die cavity sweeps completely over the working surfaces of both punches the tendency for powder to collect between the punches and the die cavity is entirely removed.

It will be appreciated that modifications may be made to the machine of this invention so as to suit different requirements when the machine is being used for dispensing the charges of powder in compressed form. Thus the heads of the punches may be profiled so as to provide any desired shape of, or monogram on, the two sides of the compressed pellet. The cross-section of the die cavity and of the punches may be circular, eliptical, square, triangular, polygonal or any other desired form. It will be understood, of course, that the form of the punch heads or shape of the die cavity is relatively unimportant when the machine is being used to dispense the powder in loose form although, of course, a smaller charge of powder would be dispensed if, say, a triangular shaped die cavity were used than with a circular die cavity, for the same gap between the punches. The gap would, therefore, need to be adjusted accordingly.

The machine according to the invention need not be restricted to two opposed punches, but may have a plurality of opposed punches and die cavities so that more than one charge of powder may be compressed and dispensed, or dispensed in loose form, per cycle of operation.

Examples of materials which may be dispensed by the machine whether in compressed or loose form are synthetic resin moulding powders, pharmaceutical and food powders, and sintered metal. The machine may also be used for making surgical articles such as tampons of compressed fibres.

I claim:

1. A machine for dispensing predetermined quantities of powder or granular material comprising a first longitudinal member, a second longitudinal member aligned with and spaced apart from the first said longitudinal member to leave a gap of predetermined length, a sleeve mounted for movement in the direction of alignment of said first and second longitudinal members and having an internal size so related to the outside dimension of each of said longitudinal members as to fit around each of said members in sliding contact therewith, a supply container for holding said material and mounted for movement with said sleeve, and means for moving the said sleeve and supply container along said longitudinal members from a first position where the sleeve lies on the said first member only and where the supply container surrounds the gap so as to fill the gap with material, to a second position where the sleeve surrounds the said gap so that the material in the gap is completely enclosed and the supply container lies on and surrounds the said second member only, and thence to a third position where the said sleeve and supply container lie on and surround the said second member only and the said gap is exposed for the discharge of the material therefrom.

2. A machine in accordance with claim 1 in which means are provided for adjusting the length of said gap prior to operation of the machine.

3. A machine for dispensing pellets of predetermined quantities of powder or granular material comprising a first longitudinal punch, a second longitudinal punch aligned with and spaced apart from the said first punch to leave a gap of predetermined length, a die mounted for movement in the direction of alignment of said first and second longitudinal punch and having an internal size so related to the outside dimension of each of said punches as to fit around each of said punches in sliding contact therewith, a supply container for holding said material mounted for movement with said die, means for moving said die along said punches relatively from a first position where the die lies on the first punch only and where the supply container surrounds said gap only so as to fill the gap with material, to a second position where the die surrounds the gap so that the material in the gap is completely enclosed and the supply container lies on and surrounds the second punch only, and thence to a third position where the die and the supply container lie on and surround the second punch only and the gap is exposed for the discharge of material therefrom, and means for bringing the two punches towards each other in said second position to compress the material therebetween.

4. A machine for dispensing pellets of predetermined quantities of powder or granular material comprising a horizontally reciprocatory longitudinal punch, a fixed longitudinal punch aligned with and spaced apart from said reciprocatory punch to leave a gap of predetermined length, means for moving the said reciprocatory punch towards and away from said fixed punch, a die mounted for movement in the direction of alignment of said punches and having an internal size so related to the outside dimension of each of said punches as to fit around each of said punches in sliding contact therewith, a horizontally reciprocatory die holder carrying said die, a supply container carried by and movable with said die holder for holding said material, and means for moving said die holder relative to said punches whereby the die slides along said punches from a first position where the die lies on one of said punches only and where the supply container surrounds the gap so as to fill the gap with material, to a second position where the die surrounds the gap so that the material in the gap is completely enclosed and the said container lies on and surrounds the other of said punches only and in which position the material in the gap is compressed by movement of the said reciprocatory punch towards said fixed punch, and thence to a third position where the die and the said container lie on and surround the said other punch only and the gap is exposed for the discharge of the compressed material therefrom.

5. A machine for dispensing pellets of predetermined quantities of powder or granular material comprising a horizontally reciprocatory longitudinal punch, a fixed longitudinal punch aligned with and spaced apart from said reciprocatory punch to leave a gap of predetermined length, a die mounted for movement in the direction of alignment of said punches and having an internal size so related to the outside dimension of each of said punches as to fit around each of said punches in sliding contact therewith, a horizontally reciprocatory die holder carrying said die, a supply container carried by and movable with said die holder for holding said material, means for moving said die holder relative to said punches whereby the die slides along said punches from a first position where the die lies on said reciprocatory punch only and where the supply container surrounds the gap so as to fill the gap with material, to a second position where the die surrounds the gap so that the material within the gap is completely enclosed and the said container lies on and surrounds said fixed punch only, and thence to a third position where the die and the said container lie on and surround the said fixed punch only and the gap is exposed for the discharge of the material therefrom, and means for moving said reciprocatory punch towards said fixed punch when in said second position to compress the material therebetween.

6. A machine in accordance with claim 5 in which hydraulic means are provided for effecting automatically the reciprocation of the die holder, the said means being controlled by movement of the die holder.

7. A machine for dispensing pellets of predetermined quantities of powder or granular material, comprising a horizontally reciprocatory longitudinal punch, a fixed longitudinal punch aligned with and spaced apart from said reciprocatory punch to leave a gap of predetermined length, a die mounted for movement in the direction of alignment of said punches and having an internal size so related to the outside dimension of each of said punches as to fit around each of said punches in sliding contact therewith, a horizontally reciprocatory die holder carrying said die, a supply container carried by and movable with said holder for holding said material, means for moving said die holder relative to said punches whereby the die slides along said punches from a first position where the die lies on said reciprocatory punch only and where the supply container surrounds a gap so as to fill the gap with material to a second position where the die surrounds the gap so that the material within the gap is completely enclosed and the said container lies on and surrounds said fixed punch only, and thence to a third position where the die and the said container lie on and surround the said fixed punch only and the gap is exposed for the discharge of the material therefrom, means for moving said reciprocatory punch towards said fixed punch when in the second position to compress said material therebetween, hydraulic means for effecting automatically reciprocation of the die holder, and means for serving to control the operation of said hydraulic means, said latter means being operated in a predetermined sequence by movement of the die holder.

8. A machine in accordance with claim 7 in which said means serving to control the operation of said hydraulic means comprise pneumatic valves operated in a predetermined sequence by movement of the die holder so as to control operation of the said hydraulic means.

9. A machine for dispensing pellets of predetermined quantities of powder and granular material, comprising a horizontally reciprocatory longitudinal punch, a fixed longitudinal punch aligned with and spaced apart from said reciprocatory punch to leave a gap of predetermined length, a hydraulic ram for moving said reciprocatory punch towards and away from said fixed punch a die mounted for movement in the direction of alignment of said punches and having an internal size so related to the outside dimension of each of said punches as to fit around each of said punches in sliding contact therewith, a horizontally reciprocatory die holder carrying said die, a supply container carried by and movable with said die holder for holding said material, a hydraulic ram for moving said die holder relative to said punches so that said die slides along said punches from a first position where the die lies on one of said punches only and where the supply container surrounds the gap so as to fill the gap with material, to a second position where the die surrounds the gap so that the material in the gap is completely enclosed and said container lies on and surrounds the other of said punches only and in which position the material in the gap is compressed by movement of the said reciprocatory punch towards said fixed punch, and thence to a third position where the die and the said container lie on and surround said other punch only and the gap is exposed for the discharge of the compressed material therefrom, said ram for moving said punch and said ram for moving said die holder being actuated in accordance with the position of the die holder.

References Cited in the file of this patent
UNITED STATES PATENTS

| | | |
|---|---|---|
| 1,473,389 | Smith et al. | Nov. 6, 1923 |
| 1,849,027 | Parde | Mar. 8, 1932 |
| 1,922,513 | Wiedmann | Aug. 15, 1933 |
| 2,384,163 | Flowers | Sept. 4, 1945 |